UNITED STATES PATENT OFFICE.

EDWARD W. HASLUP, OF BRONXVILLE, NEW YORK, ASSIGNOR TO HASLUP & PEACOCK, INC., OF NEW YORK, N. Y., A CORPORATION OF NEW YORK.

PROCESS OF EXTRACTING COMBINED POTASSIUM FROM FLUE-DUST.

1,285,152.  Specification of Letters Patent.  Patented Nov. 19, 1918.

No Drawing.  Application filed December 15, 1917.  Serial No. 207,300.

*To all whom it may concern:*

Be it known that I, EDWARD W. HASLUP, a citizen of the United States, residing at Bronxville, in the county of Westchester and State of New York, have invented certain new and useful Improvements in Processes of Extracting Combined Potassium from Flue-Dust; and I do hereby declare the following to be a full, clear, and exact description of the invention, such as will enable others skilled in the art to which it appertains to make and use the same.

This invention consists in a process of extracting potassium compounds from flue dust and has for its object to provide a method which will be more expeditious and less costly than those heretofore proposed.

With these and other objects in view the invention consists in the novel steps and combinations of steps constituting the process, all as will be more fully hereinafter disclosed and particularly pointed out in the claims.

In order that the precise invention may be clearly understood it is said:—The dust that is collected from the combustion gases of cement kilns and passed through a Cottrell precipitator is commonly called "treater" dust. It frequently contains as much as 8% or 10% or more of combined sodium and potassium, chiefly in the form of a sulfate or a sulfid, but it is usually reckoned as an oxid $K_2O$. Said dust also frequently contains from say 2% to 4% of combined potassium and sodium in the form of a silicate. The first mentioned combined potassium and sodium is water soluble while the second mentioned form is not. But, even though the alkali metal sulfates and sulfids present are capable of being directly extracted with water, yet, the sulfids can not be tolerated for fertilizer purposes, as will appear below, and on the other hand, the expense of converting said sulfids to sulfates is found to be prohibitive in practice.

The material itself is in a state of fine sub-division and its physical condition therefore renders its use as a fertilizer somewhat difficult, not only owing to its dusting tendencies when making mixtures of fertilizers, but also owing to its imperfect intermixture with other materials under commercially practicable conditions. The comparatively low potassium content of this said "treater" dust prevents its wide distribution over the country due to freight charges, and also the sulfid in the raw material renders it undesirable for use as a fertilizer owing to its slow liberation of sulfureted hydrogen ($H_2S$) when in contact with acid phosphate, for said sulfureted hydrogen is destructive to germinated seeds, as well as to root or tuber germinative development.

In carrying out this process, the soluble potassium and sodium sulfates and sulfids present in the flue dust are extracted with water containing in solution a sufficient quantity of magnesium chlorid $MgCl_2$, to decompose all the alkali metal sulfids present. In the case of potassium sulfids, the reaction will be in accordance with the following equation:—

(a) $K_2S + MgCl_2 + H_2O = $
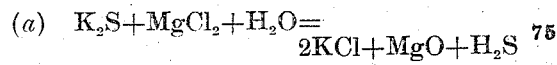
$2KCl + MgO + H_2S$

Of course a similar equation will represent the formation of sodium chlorid from the sodium sulfid present. In both cases, it will be observed that the sulfur of the sulfids pass off in the form of $H_2S$, and therefore, no sulfureted hydrogen is left in the compounds to react with any acid phosphate with which the material may be later mixed. The soluble potassium and sodium chlorids thus produced being free from sulfids, may now be separated out as by filtration, from the insoluble residue, containing the insoluble combined materials, such as silicates, leaving the latter to be digested with calcium or magnesium chlorid, or with precipitated calcium sulfate. If a precipitated calcium sulfate is employed the reaction in the case of a potassium silicate will be as follows:—

(b) $K_2Si_2O_5 + CaSO_4 = K_2SO_4 + CaSi_2O_5$
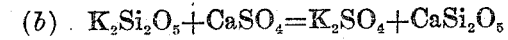

A similar reaction of course will take place in the case of the sodium silicates present, and the corresponding sodium sulfate will result.

The potassium and sodium sulfates thus produced may be separated out by filtration or otherwise.

Should the "treater" dust not contain a considerable proportion of combined sulfids, it will not be necessary to first remove the sulfids in order to produce a high grade potassium salt. In that case all that is necessary to do to produce a suitable potassium salt for fertilizer purposes is to add to the dust an excess of precipitated or hydrated calcium sulfate, and extract the potassium in any suitable digester, whereupon the silicates will be decomposed and the solution containing the potassium may be filtered out and concentrated to obtain the crude potassium sulfate.

It is an important feature of this invention that the alkali metal sulfids such as $K_2S$ are decomposed with a solution of magnesium chlorid in accordance with equation (a) for I am thus enabled, in a single operation, to get rid of all the sulfids present and to therefore avoid the danger of said sulfids later liberating hydrogen sulfid when mixed with acid phosphate. That is to say, whether sodium salts are present in the treater dust or not, by following the above procedure one is enabled, inexpensively and expeditiously, to eliminate the alkali metal sulfids contained in the dust, and to produce crude soluble alkali metal compounds suitable for fertilizer purposes, and all by using such comparatively inexpensive reagents, as crude calcium chlorid and crude magnesium chlorid.

It will be seen that it is not necessary to first remove the soluble salts, for the whole process may be carried out in one digesting operation. It will also be observed that magnesium chlorid will decompose the insoluble silicates present as will also the hydrated calcium sulfate.

It will also be observed that one likewise obtains crude potassium sulfate from the insoluble silicates of said dust by employing the comparatively cheap hydrated calcium sulfate as a reagent. Of course, any suitable sulfate or chlorid of the alkaline earths may also be used.

What I claim is:—

1. The process of making potassium chlorid from potassium sulfid in the presence of sodium and potassium sulfates carried by flue dust which consists in reacting on said sulfid with a solution of magnesium chlorid, substantially as described.

2. The process of producing potassium sulfate from "treater" dust which consists in digesting the insoluble residues with a hydrated alkaline earth metal sulfate, substantially as described.

3. The process of producing potassium sulfate from the insoluble silicate residues of "treater" dust which consists in digesting the insoluble potassium containing silicate residue with hydrated calcium sulfate, substantially as described.

4. The process of producing crude potassium compounds suitable for fertilizer purposes from treater dust containing potassium sulfids and silicates which consists in treating said dust with a solution of magnesium chlorid to decompose the potassium sulfids present and to extract the soluble potassium compounds; separating out said compounds from their insoluble residue containing said silicates; and digesting said residue with a hydrated calcium sulfate, to form potassium sulfates from said silicates, substantially as described.

In testimony whereof I affix my signature, in presence of two witnesses.

EDWARD W. HASLUP.

Witnesses:
MARY C. WALSH,
EVELYN M. CAHILL.